United States Patent [19]

Takenaka et al.

[11] 4,416,458
[45] Nov. 22, 1983

[54] MECHANICAL FACE SEAL WITH MINUTE PORES IN SLIDING SURFACE

[75] Inventors: Akira Takenaka; Keiichi Shimazaki, both of Nagoya; Yasumitsu Kuwazuru, Toyota, all of Japan

[73] Assignee: Taiho Kogyo Kabushiki Kaisha, Aichi, Japan

[21] Appl. No.: 419,575

[22] Filed: Sep. 17, 1982

[30] Foreign Application Priority Data

Sep. 18, 1981 [JP] Japan .................. 56-147244

[51] Int. Cl.³ .................. F16J 15/20; F16J 15/34
[52] U.S. Cl. .................. 277/96.1; 277/1; 277/96.2; 277/215; 277/DIG. 6
[58] Field of Search .................. 277/1, 96, 96.1, 96.2, 277/203, 207 R, 208, 224, DIG. 6, 134, 215, 53

[56] References Cited

U.S. PATENT DOCUMENTS 3,572,730 3/1971 Otto et al. .................. 277/134 X
3,822,066 7/1974 Keys .................. 277/96

FOREIGN PATENT DOCUMENTS 751297 6/1956 United Kingdom .................. 277/53
754148 8/1980 U.S.S.R. .................. 277/96.1

Primary Examiner—Robert S. Ward
Attorney, Agent, or Firm—Koda and Androlia

[57] ABSTRACT

A mechanical seal having a fixed member airtightly fixed along the outer circumference thereof in a bearing house formed in the housing of a compressor, a support member mounted on the rotary shaft of the compressor received through the bearing house and supported rotatably in the housing, a rotary member airtightly mounted along the inner circumference thereof on the rotary shaft and a spring disposed between the rotary member and the support member to press the rotary member against the fixed member in the axial direction. The sliding surface of the rotary member to be in sliding contact with the sliding surface of the fixed member has a hardness of Hv 350 and above and minute pores of 30 μm and less in maximum major diameter to retain lubricating oil therein so that the housing of the compressor is sealed to prevent leakage of the gas and the lubricating oil contained within the housing through the bearing house.

1 Claim, 15 Drawing Figures

MECHANICAL FACE SEAL WITH MINUTE PORES IN SLIDING SURFACE

BACKGROUND OF THE INVENTION

This invention relates to a mechanical seal formed between a stationary portion and a rotary shaft which is rotatable relative to the stationary portion and more particularly to a mechanical seal formed in the shaft sealing portion of the rotary shaft of a compressor, particularly an axial plunger type compressor.

Usually, such a mechanical seal formed between a stationary portion and a rotary shaft consists of a fixed member fixed airtightly to the stationary portion with a small clearance between the fixed member and the rotary shaft and a rotary member joined airtightly to the rotary shaft so as to rotate together with the rotary shaft and is adapted to prevent gas or liquid leakage through the pressurized contact between the rotary member and the fixed member. In a generally known mechanical seal, the fixed member is formed in an annular member (seat ring) to be fixed to said stationary portion. The rotary member is formed in an annular member (follower ring or a rotary ring) to receive the rotary shaft through the center hole thereof and fixed airtightly to the rotary shaft through a sealing member. An annular sealing surface formed so as to protrude on one side of the rotary member is pressed slidably against one side of the fixed member by the resilient force of a spring.

In the mechanical seal of such a constitution, the fixed member (seat ring) and the rotary member (follower ring) are required to be frictionally durable and strong, therefore, it is usual to form the rotary member with sintered carbon or a composite material of a synthetic resin and carbon and to form the fixed member (seat ring) with stellite, a stainless steel or a high silicon cast iron.

In a compressor for an automotive cooler, such as a rotary compressor, an axial plunger type compressor or a reciprocating compressor, a gaseous refrigerant is subjected to compressive actions within a closed circuit, in which the refrigerant is compressed in the compressor, discharged, condensed in a condenser, vaporized and allowed to expand in an evaporator and then, the evaporator gaseous refrigerant is sucked again into the cylinder through the suction port of the compressor. The further detail of this compression-expansion cycle will be described with reference to an axial plunger type compressor hereunder. A lubricating oil is atomized within the compressor housing and is supplied, together with the refrigerant, to portions requiring lubrication, such as a clearance between the piston and the cylinder and the surface of the swash plate to be in contact with the piston shoes. However, excessive lubricating oil supply reduces the cooling efficiency of the cooler due to circulation of the lubricating oil through the closed circuit including the condenser and the evaporator together with the refrigerant, therefore, it is required to separate the lubricating oil from the refrigerant, though very difficult to attain perfectly, or to reduce lubricating oil supply rate. Furthermore, the oil pump is eliminated in some compressors to meet a requirement for reducing the size as well as the weight of the compressor itself to facilitate mounting the compressor on a vehicle.

Since the compressor for an automotive cooler is further driven by an internal combustion engine, it is subjected to unsteady driving speed varying within a wide range of revolving speed from 500 rpm during idling operation to 6500 rpm during high speed running or sudden acceleration and also to variable operating conditions. Besides, reduced lubricating oil supply rate makes extremely difficult for supplying lubricating oil to the sliding portions of the shaft sealing device (mechanical seal) provided for the shaft sealing section of the rotary shaft of the compressor, consequently, the mechanical seal of the shaft sealing section is compelled to be operated under extremely severe operating conditions, in which solid friction between dry sliding surfaces of the sliding portions of the mechanical seal is likely to occur due to insufficient lubrication despite the lubrication with a mixed mist of a lubricating oil and a gaseous refrigerant which are sealed within the refrigerating circuit including the compressor.

SUMMARY OF THE INVENTION

The primary object of the present invention is to provide a mechanical seal capable of remarkably reducing leakage of a gas and lubricating oil.

Another object of the present invention is to provide a mechanical seal eliminated of the risk of solid friction between the fixed member and the rotary member thereof by retaining an extremely small amount of a lubricating oil over the sliding surfaces of the rotary member and the fixed member.

Further object of the present invention is to provide a mechanical seal having minute pores formed in a predetermined density in the sliding surface of either the fixed member or the rotary member thereof and retaining a lubricating oil in the minute pores.

According to the present invention, either the fixed member or the rotary member of the mechanical seal is formed of a metallic material and has a sliding surface having a hardness Hv 350 and above and minute pores having maximum major diameter of 30 $\mu$m and below and the number of such pores is from 100 to 270 per 2.5 mm measuring unit length when counted by scanning the sliding surface by means of a roughness measuring instrument provided with a contact needle having a rounded point of 2 $\mu$m radius, magnifying the measured roughness curve longitudinally by 20,000 times and laterally by 100 times on a recording paper, drawing peak count level lines in parallel to and apart by ±0.25 mm in dimensions on said recording paper from the mean reference line in the magnified measured roughness curve and assuming that there is one pore when the upper peak count level line intersects the magnified roughness curve at least once within two intersections between the lower count level line and the magnified roughness curve.

BRIEF DESCRIPTION OF THE DRAWINGS

There and other objects and advantages of the present invention will be apparent to those skilled in the art after the following description of the preferred embodiments of the present invention with the results of experiments and tests in accordance with the principles of the present invention, taken in conjunction with the accompanying drawings, in which.

DETAILED DESCRIPTION OF THE PREFERRED EMBODIMENTS

Figure 1:
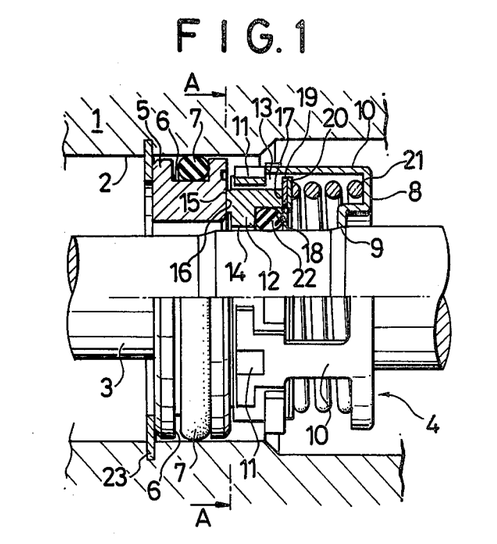
FIG. 1 is a side elevation partly sectional of a preferred embodiment of the mechanical seal in accordance with the present invention.
Figure 2:
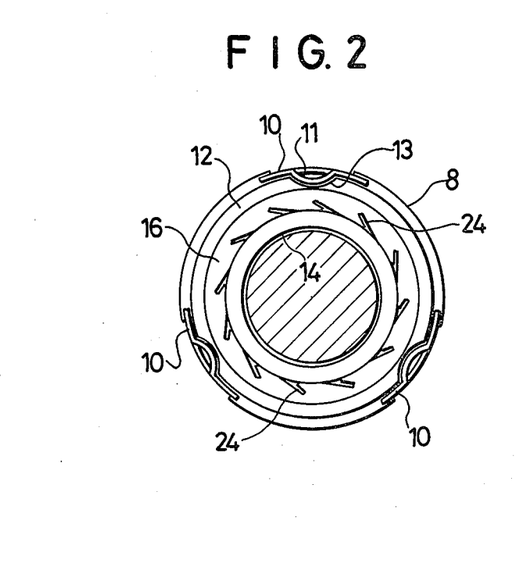
FIG. 2 is a sectional view taken along line II—II of FIG. 1.

FIG. 1 is a side elevation partly sectional of a preferred embodiment of the mechanical seal in accordance with the present invention and FIG. 2 is a sectional view taken along line II—II of FIG. 1, in which the rotary shaft 3 of a compressor or the like is rotatably supported by means of a mechanical seal 4 in a bearing house 2 formed in a receiving body 1 such as the cylinder head of a compressor.

The fixed member 5 (seat ring) of the mechanical seal 4 is formed of an annular plate and receives an O-ring 7 in an annular groove 6 formed in the outer circumference thereof. The fixed member 5 is fitted in the bearing house 2 so as to seal between the fixed member 5 and the inner circumference of the bearing house 2 with the O-ring 7. A press-formed support member 8 receives the rotary shaft 3 through the center hole 9 thereof so as to engage with a shoulder formed in the rotary shaft 3 and is arranged within a plane which is perpendicular to the rotary shaft 3. A plurality of integral leg portions 10 are formed in the support member 8 in parallel to the rotary shaft 3. A projection 11 formed at the free end of each leg portion 10 is engaged with a recess 13 formed in the outer circumference of an annular rotary member (rotary ring) 12 loosely receiving the rotary shaft 3 therethrough.

The rotary member 12 is formed in an annular shape having a center hole 14 loosely receiving the rotary shaft 3 therethrough. An annular sliding surface 16 to be in sliding contact with a sliding surface 15 of the fixed member 5 is formed on one axial side of the rotary member 12, while an annular seat surface 17 and a recess 18 having a diameter greater than that of the center hole 14 are formed on the other axial side of the rotary member 12. An annular seat plate 20 is disposed in axial contact with the seat surface 17 through an annular packing 19 which is made of a material such as rubber, etc. A coil spring 21 is interposed between the seat plate 20 and the support member 8 so as to press the sliding surface 16 of the rotary member 12 against the sliding surface 15 of the fixed member 5 with the resilient force. An O-ring 22 is fitted in the recess 18 of the rotary member 12 to seal between the rotary shaft 3 and the rotary member 12. The fixed member 5 is located with respect to the receiving body 1 by means of a snap ring 23 fitted in an annular groove cut in the inner circumference of the bearing house 2 and the resilient force of the spring 21. A plurality of radial grooves 24 each extending approximately to a halfway point of the radial width of sliding surface 16 and opening at the inner end thereof into the center hole 14 are formed in the sliding surface 16 of the rotary member 12.

In this mechanical seal, the rotary member 12 rotates following the rotation of the rotary shaft 3 owing to the engagement between the rotary member 12 and the support member 8, while the sliding surface 16 thereof is kept in sliding contact with the sliding surface 15 of the fixed member 15 by the resilient force of the spring 21 so that bearing house 2 is kept sealed with the sliding surfaces 15 and 16 and the O-rings 7 and 22.

According to the present invention, either the fixed member or the rotary member of the mechanical seal is formed of a metallic material having a sliding surface of a hardness Hv 350 and above and from 100 to 270 pores per 2.5 mm measuring length, the maximum major diameter of each pore being 30 μm and less. In this embodiment, the fixed member is formed of such a metallic material.

Metallic materials, such as quenched steels of Japanese Industrial Standard SUJ-2, FC-20 and S55C and hard chromium plated those materials (not quenched) are suitably applicable to the sliding surfaces. A polishing-after-lapping process, polishing-after-shot blasting process, polishing-after-electrolytic polishing (etching) process and polishing-after-corrosion (etching) process are suitable to form a plurality of pores of 30 μm in the maximum major diameter in the surface of those materials.

Figure 3:
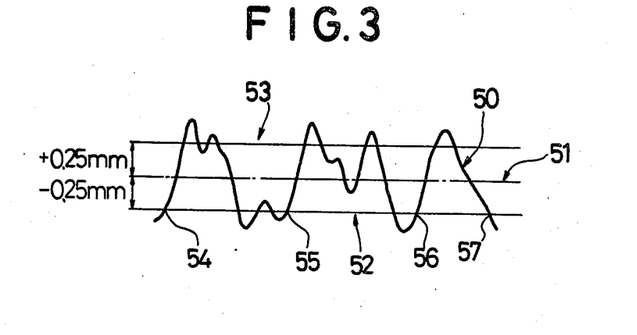
FIG. 3 is a diagram showing a method of counting pores in accordance with the present invention.

According to the present invention, the number of pores formed in the sliding surface of the rotary member or the fixed member is counted in the following method. Employing a surface roughness measuring instrument (e.g. Model SE-3C, Kosaka Kenkyujo K.K.) equipped with a contact needle having a spherical point of 2 μm in radius, the sliding surface is scanned with the point of the contact needle and the output signals of the surface roughness measuring instrument are processed through a surface roughness analyzer (Model AY-22, Kosaka Kenkyujo K.K.) to draw a surface roughness curve on a recording paper in a longitudinal magnification of 20,000 times and a lateral magnification of 100 times. In the drawing, peak count level lines are drawn in parallel to and apart by 0.25 mm in dimensions shown on the recording paper above and below from the mean reference line in the magnified surface roughness curve and the number of pores is counted in the drawing assuming that there is one pore when the upper peak count level line intersects the magnified surface roughness curve at least once within two intersections between the lower peak count level line and the surface roughness curve. As shown in FIG. 3 in an enlarged view, an upper peak count level line 53 and a lower peak count level line 52 are drawn 0.25 mm in dimensions shown on the recording paper above and below, respectively, in parallel to the mean reference line 51 of the surface roughness curve 50 drawn on the recording paper. Between intersecting points 54, 55, 56 and 57 between the surface roughness curve 50 and the lower peak count level line 52, the surface roughness curve 50 intersects the upper peak count level line 53 once or plural times and, therefore, one pore is counted in each of ranges between intersecting points 54 and 55, between intersecting points 55 and 56 and between intersecting points 56 and 57. Such a counting operation is not necessarily performed on the recording paper, but it is possible to make the surface roughness analyzer automatically measure the pore count of the surface roughness curve 50 by setting the upper and lower peak count levels in the surface roughness analyzer.

Figure 4:
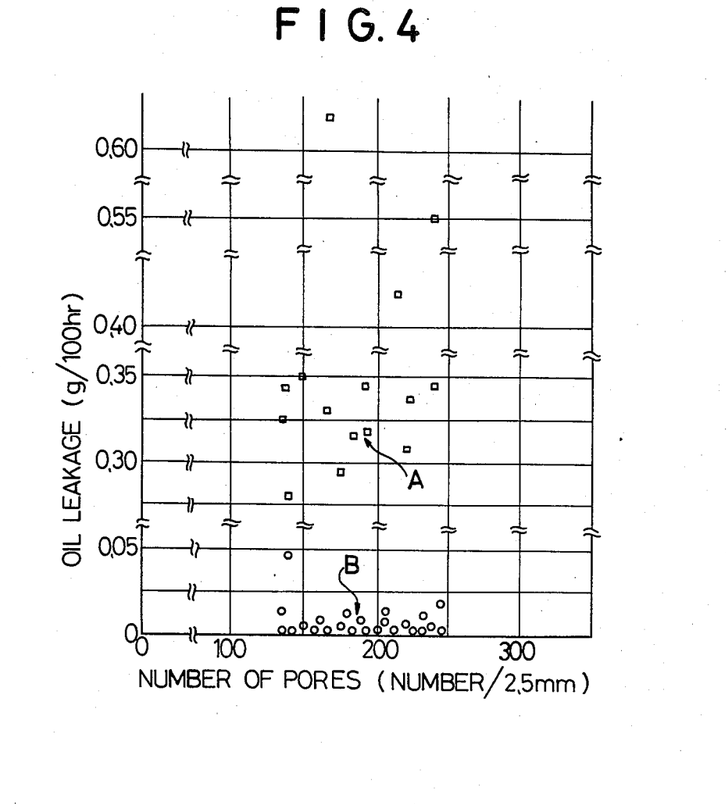
FIG. 4 is a diagram showing the relationship between the amount of oil leakage and the number of pores varying due to difference in the shapes of pores in the sliding surfaces.

In order to explain the feature of the present invention, test mechanical seals as shown in FIGS. 1 and 2 were fabricated. The rotary member (surface roughness: 0.4 $\mu$m Rz per 0.25 mm measuring length) was formed of a material produced by kneading a mixture consisting of 60% in weight of graphite powder of grain size of 100 $\mu$m or less, 8% in weight of silicon dioxide powder of grain size of 50 $\mu$m or less and the rest of phenol resin, molding the kneaded mixture in an annular shape, pressure-heating the molded kneaded mixture for three minutes at 170° C. under a pressure of 350 kg/cm$^2$ in a metal mold and then, curing the synthetic resin for 12 hours at 300° C. in a shape shown in the drawings. Two kinds of fixed members are prepared by using, Japanese Industrial Standard, bearing metal SUJ-2 and processing through different sliding surface finishing processes. Those different fixed members were subjected to comparative tests in combination with the rotary members. FIG. 4 shows the test results.

One of the fixed members is prepared by forming the member of SUJ-2 steel, subjecting the member to quenching process, grinding the sliding surface and polishing the sliding surface with the abrasive grains of alumina of 0.3 $\mu$m in grain size. The other fixed member is prepared by forming the member of SUJ-2 steel, subjecting the member to quenching process, lapping the quenched member with abrasive grains of alumina of 20 $\mu$m in gain size and finally by polishing the member with the abrasive grains of alumina of 0.3 $\mu$m in grain size. The sliding surfaces of all the fixed members are finished in a range from 0.2 to 0.4 $\mu$m Rz (measuring length 0.25 mm) in the surface roughness. The number of pores formed in the sliding surfaces of those fixed members were measured prior to subjecting the fixed members to the comparative tests. The number of pores was in a range from 130 to 250/2.5 mm.

An axial plunger type compressor of 148 ml displacement was employed in the comparative tests. The mechanical seal was fitted on the rotary shaft of the compressor and 148 ml of a refrigerating machine oil was sealed in the compressor. Then, the amount of oil leakage (g) was measured after operating the compressor for 100 hours at 2000 rpm revolving speed, 2 kg/cm$^2$ internal pressure and 4 kg spring load. The oil leakage test process as described hereinbefore will be referred to as compressor oil leakage test hereinafter.

FIG. 4 shows the results of compressor oil leakage tests in terms of the relationship between the number of pores formed in the sliding surface and the amount of oil leakage for the fixed member processed through grinding indicated by square marks (□) and for the fixed member processed through lapping indicated by circular marks (o). It is apparent from FIG. 4 that the amount of oil leakage through a mechanical seal employing the fixed member processed through lapping is 0.05 g/100 hr or less, where as the amount of oil leakage through a mechanical seal employing the fixed member processed through grinding is in a range from 0.28 to 0.62 g/100 hr, which is excessively greater than that of the former, despite the same surface roughness.

Figure 5:
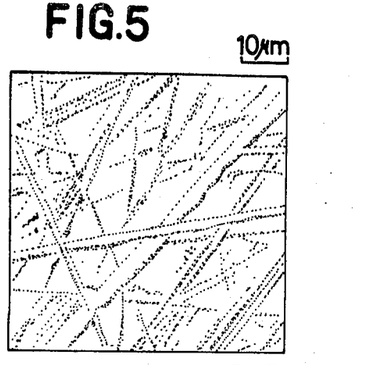
FIGS. 5 and 6 are reproductions of scanning electron microscopic photographs of sliding surfaces indicated at A and B in FIG. 4.
Figure 6:
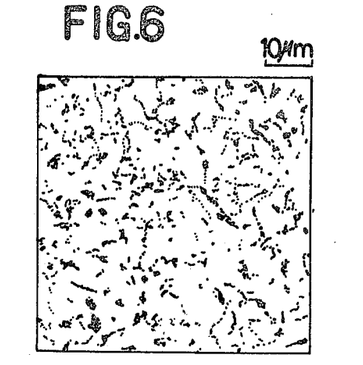

FIGS. 5 and 6 show the reproductions of scanning electron microscopic photographs of the respective sliding surfaces of the fixed member processed through grinding, which is indicated at A in FIG. 4, and the fixed member processed through lapping, which is indicated at B in FIG. 4. Practically parallel linear grinding marks remain over the sliding surface processed through grinding (FIG. 5) even after smoothing the surfaces by polishing and, although numerous pores (186 pores/2.5 mm) of from 200 $\mu$m to 4 mm in major diameter or in length are formed in the sliding surface, the amount of oil leakage is as great as 0.315 g/100 hr. On the other hand, the sliding surface processed through lapping (FIG. 6) has pores of 30 $\mu$m or less in major diameter and 214 pores/2.5 mm in number, which number is practically the same with that of pores in the sliding surface of FIG. 5, however, the amount of oil leakage is as small as 0.0016 g/100 hr, which is extremely small. This fact verifies that the shape of pores formed in the sliding surface affects the oil-retaining performance of the sliding surface greatly and that oil leakage is reduced remarkably when the maximum major diameter of the pores is 30 $\mu$m and less.

Figure 7:
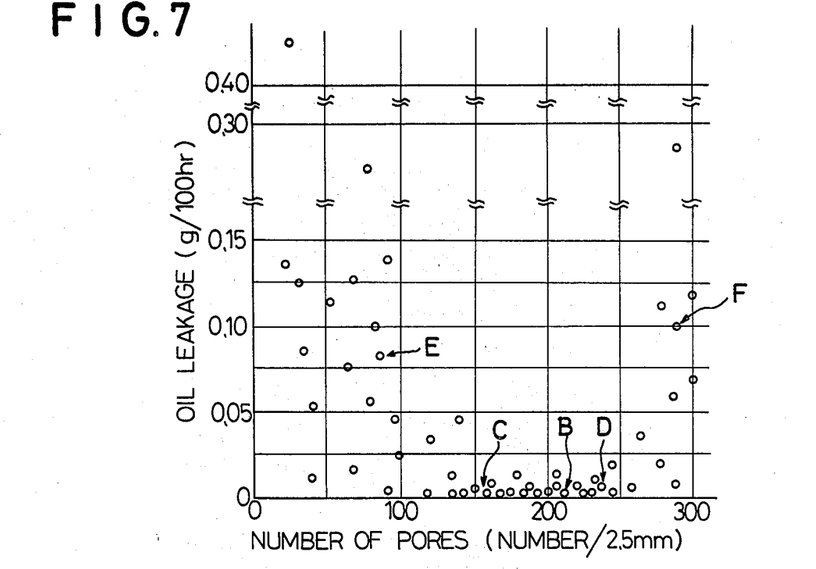
FIG. 7 is a diaphragm showing the relationship between the number of pores in the sliding surface and the amount of oil leakage.
Figure 8:
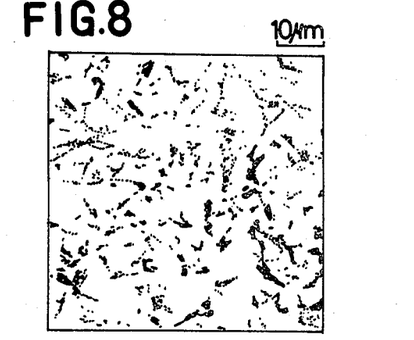
FIGS. 8 to 11 are reproductions of scanning electron microscopic photographs of sliding surfaces indicated at C, D, E and F in FIG. 7.
Figure 9:
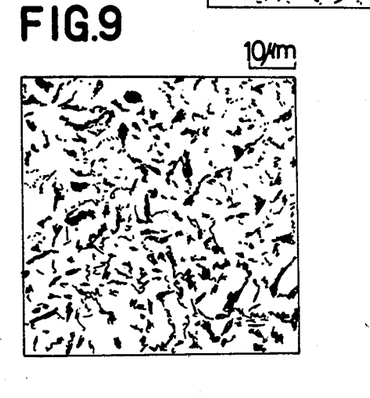
Figure 10:
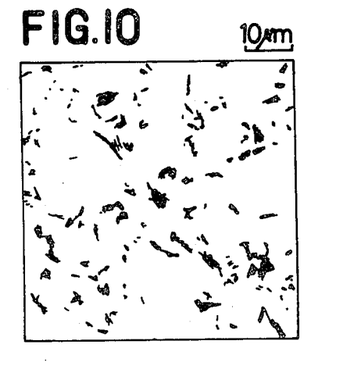
Figure 11:
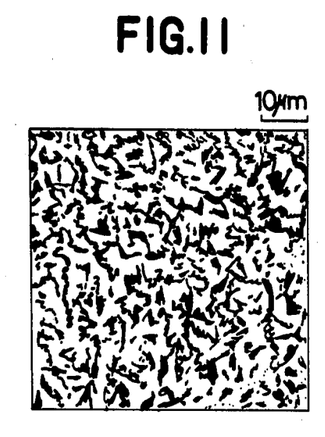

Then, fixed members prepared by forming the members of SUJ-2 steel, hardening the members to a hardness from Hv 700 to 800 in Vickers hardness system through quenching process, processing the sliding surfaces through the same lapping process as employed in the previous tests and then finishing the sliding surfaces through the same polishing process as employed in the previous tests were subjected to compressor oil leakage tests in combination with the same rotary member as used in the previous compressor oil leakage tests. FIG. 7 shows the test results in terms of the relationship between the number of pores and the amount of oil leakage. As apparent from FIG. 7, the amount of oil leakage through a mechanical seal employing a fixed member having from 100 to 270 pores/2.5 mm was 0.05 g/100 hr or less, whereas the amount of oil leakage through a mechanical seal tends to increase sharply when the number of pores is less than 100 or more than 270.

FIGS. 6 and 8 to 11 show the reproductions of the scanning electron microscopic photographs of the respective sliding surfaces of the fixed members indicated at B, C, D, E and F in FIG. 7. The fixed member indicated at B is the same fixed member with the member indicated at B in FIG. 4. The number of pores and the amount of oil leakages of the fixed members are: fixed member (FIG. 8) G: 156 pores/2.5 mm and 0.0017 g/100 hr, fixed member D (FIG. 9): 242 pores/2.5 mm and 0.0052 g/100 hr, fixed member E (FIG. 10): 82 pores/2.5 mm and 0.0842 g/100 hr and fixed member F (FIG. 11): 294 pores/2.5 mm and 0.1033 g/100 hr. The respective amounts of oil leakage of the fixed members E and F are greater than those of the fixed members C and D. It was found through the comparative examination of the respective sliding surfaces of those fixed members that the amount of oil leakage decreases extremely when the number of pores is in a range from 100 to 270 pores/2.5 mm provided that the maximum major diameter of the pores is 30 $\mu$m and less, whereas the amount of oil leakage increases remarkably when the number of pores lies outside of the range. Referring to FIGS. 6 and 8 to 11, the maximum major diameter of the most pores formed in the sliding surfaces of the fixed members providing reduced oil leakage is 10 $\mu$m and less.

Figure 12:
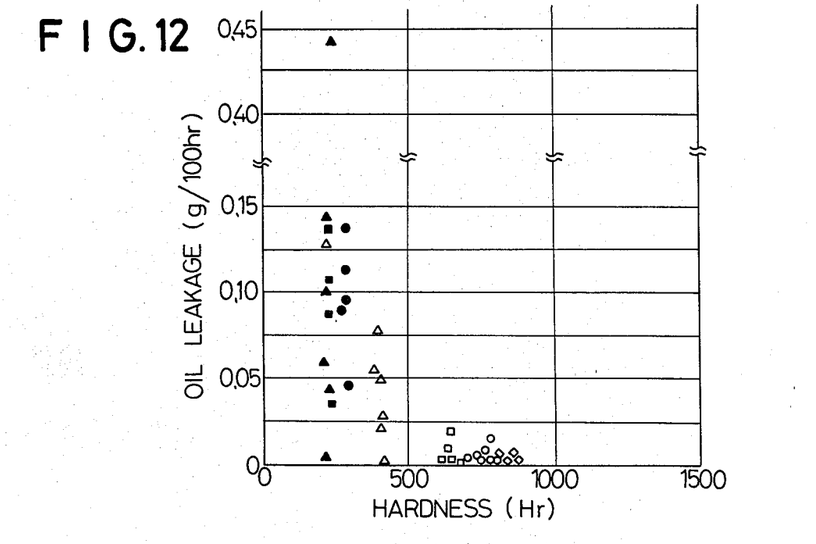
FIG. 12 is a diagram showing the relationship between the amount of oil leakage and the hardness of the material forming the sliding surface.

It is obvious that the insufficient wear resistance of the sliding surfaces of the fixed and rotary members of the mechanical seal results in unstable sealing performance of the mechanical seal due to wear during extended period of operation. Particularly, when the sliding surface is formed of a metallic material, the hardness of the metallic material is a significant factor of the wear resistance. Fixed members formed of SUJ-2, FC-20, S55C steels, Japanese Industrial Standard, (either quenched or not quenched) were prepared and subjected to compressor oil leakage tests in combination with the same rotary members as used in the previous tests. The test results are shown in FIG. 12, in which the marks represent: blank circle "o": SUJ-2 steel, quenched, black circle "●": SUJ-2 steel, not quenched, blank triangle "△": FC-20 steel, quenched, black triangle "▲": FC-20 steel, not quenched, blank square "□": S55C steel, quenched, black square "■": S55C steel, not quenched, and blank rhombus "◇": S55C steel, not quenched and hard chromium plated sliding surface. The sliding surfaces of those fixed members are finished through the lapping and polishing processes as employed in the previous tests and the surface roughness is adjusted to in a range from 0.2 to 0.4 μm Rz (measuring length: 0.25 mm). The number of pores in those sliding surfaces is in a range from 150 to 220 pores/2.5 mm.

FIG. 12 shows the test results, in which the axis of abscissa and the axis of ordinate represent the hardness of the fixed members in the Vickers hardness system and the amount of oil leakage, respectively. The fixed members of steels not quenched are Hv 300 or less in hardness and the oil leakage properties of those fixed members are extremely unstable. On the other hand, the fixed members of quenched FC-20 steel are from Hv 360 to 440 in hardness and 0.055 g/100 hr or less in oil leakage, which is considerably low, and the fixed members of quenched SUJ-2 steel, quenched S55C steel and hard chromium plated S55C steel are Hv 550 and above in hardness and 0.02 g/100 hr or less in oil leakage, which is extremely excellent. As obvious from FIG. 12, with the number of pores being from 150 to 220 pores/2.5 mm, the oil leakage can remarkably be reduced when the hardness of the sliding surface is higher than the quenched metallic material, namely, Hv 350 and above and, particularly, the oil leakage can sharply be reduced when the hardness of the sliding surface is Hv 550 and above.

Athough it is a general conception that oil leakage through the sliding surfaces between the fixed member and the rotary member of a mechanical seal can be reduced by finishing the sliding surfaces as smooth as possible, in the light of those facts as demonstrated hereinbefore and as shown in FIG. 4, even in the sliding surfaces of the same material, practically having the same surface roughness (0.2-0.4 μm Rz) and practically having the same number of pores for retaining oil for lubrication (130 to 250 pores/2.5 mm), the oil leakage preventing performance can vary between the fixed members depending on the difference in the shape of pores resulting from difference in the manufacturing process, namely, the amount of oil leakage is as great as 0.28 g/100 hr when the maximum major diameter of the pores is 200 μm or above, whereas the amount of oil leakage is as small as 0.05 g/100 hr or less when the maximum major diameter of the pores is 30 μm and less.

As obvious from FIG. 7, even in the fixed members of the same material and of the same manufacturing process, the amount of oil leakage increases remarkably with the fixed members having a sliding surface having pores less than 100 pores/2.5 mm or more than 270 pores/2.5 mm as compared with the amount of oil leakage with the fixed members having a sliding surface having from 100 to 270 pores/2.5 mm. As obvious from FIG. 12, the amount of oil leakage increases due to wear of the sliding surfaces when the hardness of the sliding surface is Hv 350 and less even if the sliding surface is formed through the same process. Accordingly, excellent oil leakage prevention can be attained by forming from 100 to 270 pores/2.5 mm in the sliding surface of a metallic fixed member having a hardness of Hv 350 and above.

Some embodiments of the present invention, having sliding surfaces formed through different processes, will be described hereinafter.

EMBODIMENT 1

A fixed member was formed of SUJ-2 steel and the fixed member was quenched to adjust the hardness to in a range from Hv 700 to 800. The sliding surface of the quenched fixed member was subjected to lapping process using alumina ($Al_2O_3$) abrasive grains of 20 μm in grain size and then, to polishing process using alumina abrasive grains of 0.3 μm in grain size. The number of pores was 214 pores/2.5 mm. The reproduction of the scanning electron microscopic photograph of the sliding surface is shown in FIG. 6.

A rotary member was produced by kneading a mixture consisting of 60% in weight of graphite powder of 100 μm or less in grain size, 10% in weight of silicon dioxide powder of 50 μm or less in grain size and the rest part of phenol resin, molding the kneaded mixture into a rotary member, pressure-heating the molded rotary member for 3 minutes at 170° C. under 350 kg/cm² pressure and then, curing the member for 12 hours at 190° C. to finish the rotary member. The fixed member and the rotary member thus prepared were combined and subjected to the compressor oil leakage test. An amount of oil leakage of 0.0021 g/100 hr was resulted.

The shape and the number of pores formed in the sliding surface can be controlled by selectively determining the kind and grain size of abrasive grains used for the lapping process and the conditions of the lapping process.

EMBODIMENT 2

Figure 13:
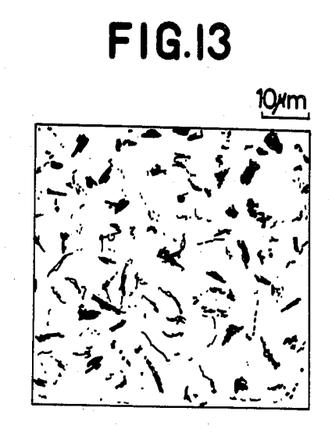
FIGS. 13 to 15 are reproductions of scanning electron microscopic photographs of the sliding surfaces of embodiments formed by different methods.

The sliding surface of a fixed member the same with that of the Embodiment 1 was subjected to shot blast process using alumina abrasive grains of 30 μm in grain size and then, to polishing process using alumina abrasive grains of 0.3 μm in grain size. The number of pores was 142 pores/2.5 mm. The reproduction of the scanning electron microscopic photograph of the sliding surface is shown in FIG. 13.

The fixed member thus prepared and a rotary member the same with that of Embodiment 1 were combined and subjected to the compressor oil leakage test. An amount of oil leakage of 0.008 g/100 hr was resulted.

The properties of the sliding surface can be controlled by selectively determining the kind and grain size of the abrasive grains for shot blasting process or the shot blasting conditions.

EMBODIMENT 3

Figure 14:
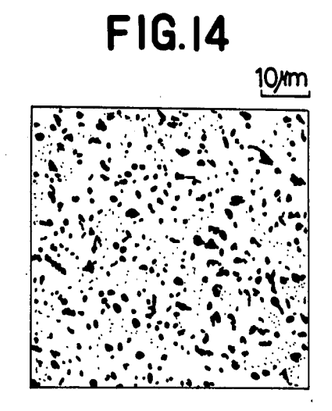

The sliding surface of a fixed member the same with that of the Embodiment 1 was etched for 2.5 minutes through electrolytic polishing process using 5% aqueous solution of nitric acid and 5A electric current intensity and then, the sliding surface was further polished using alumina abrasive grains of 0.3 μm in grain size. The number of pores was 188 pores/2.5 mm. The scanning electron microscopic photograph of the surface is shown in FIG. 14.

The fixed member thus prepared and a rotary member the same with that of Embodiment 1 were combined and subjected to the compressor oil leakage test. An amount of oil leakage of 0.0045 g/100 hr was resulted.

The properties of the sliding surface can be controlled by selectively determining the electrolytic polishing conditions.

EMBODIMENT 4

Figure 15:
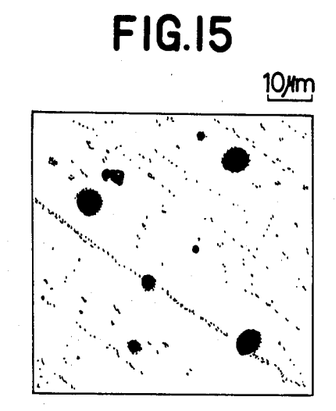

The sliding surface of a fixed member the same with that of the Embodiment 1 was subjected to etching process using an aqueous etching solution consisting of 30% chloric acid, 40% sulphuric acid, 5.5% carbon tetrachloride, 0.5% nitric acid and the rest part of water and then, the sliding surface was further polished using alumina abrasive grains of 0.3 μm in grain size. The number of pores was 101 pores/2.5 mm. The reproduction of the scanning electron microscopic photograph of the surface is shown in FIG. 15.

The fixed member thus prepared and a rotary member the same with that of Embodiment 1 were combined and subjected to the compressor oil leakage test. An amount of oil leakage of 0/0105 g/100 hr was resulted.

The properties of the sliding surface can be controlled by selectively determining the etching conditions.

Since forming the sliding surface with a metallic material in the fixed member or the rotary member is reciprocal, the same oil leakage preventing effect can be obtained when the fixed member is formed with a graphite-dominant material and the rotary member is formed with a material having a hardness of Hv 350 and above and from 100 to 270 pores/2.5 mm minute pores of 30 μm and less maximum major diameter in the sliding surface, instead of forming the fixed member with a metallic material and processing the sliding surface thereof to provide the hardness, shape and number of pores as described hereinbefore and forming the rotary member with a graphite-dominant material.

The graphite-dominant material as mentioned herein is prepared by molding a mixture of from 40 to 70% in weight of graphite powder of 100 μm or less in grain size, from 2 to 15% in weight of additive of 50 μm or less in grain size, such as silicon dioxide, silicate, boron nitride or two or more of them, and the rest part of a resin component, such as phenol resin, epoxy resin polyimide resin or furan resin, and by pressure-heating in the molding process to cure the resin component. Phenol resin is most suitable. It is recommended to cure the resin component through the molding process, in which the mixture is heated in a metal mold for 3 minutes at substantially 170° C. under a pressure of 350 kg/cm² and then cured for substantially 12 hours at substantially 300° C.

What is claimed is:
1. A mechanical seal comprising:
   a fixed member to be fixedly attached to a stationary portion where sealing is required;
   a rotary member to be fixedly mounted to a rotary shaft rotatably mounted in said stationary portion; and
   means for pressing said rotary member against one axial side of said fixed member so as to slidably contact a sliding surface of said rotary member to a sliding surface of said fixed member;
   one of said sliding surfaces being formed of a metallic material having a hardness of 350 and more than 350 in Vickers hardness system Hv and provided minute pores of not exceeding 30 μm in major diameter and from 100 to 270 per measuring length of 2.5 mm in number;
   said number of minute pores being counted by scanning said sliding surface by means of a contact needle having a rounded tip of 2 μm in radius being equipped with a surface roughness measuring instrument, drawing measured roughness in magnified curve longitudinary by 20,000 times and laterally by 100 times on a recording paper, drawing upper and lower peak count level lines in parallel to and apart by 0.25 mm in dimensions shown in the recording paper above and below the mean reference line in the magnified measured roughness curve on said recording paper and counting the number of pores assuming that there is one pore when said upper peak count level line intersects the magnified measured roughness curve at least once within two intersections between said lower peak count level line and said magnified measured roughness curve.

* * * * *